(No Model.)
W. L. GORDON.
NUT LOCK.
No. 584,158.  Patented June 8, 1897.
Fig. I.
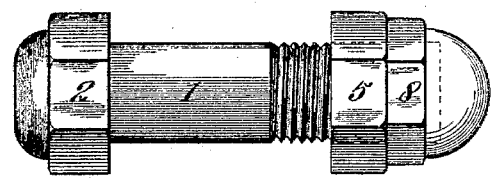
Fig. II.   Fig. III.   Fig. IV.
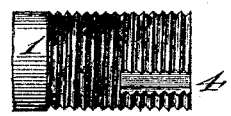 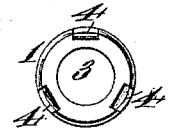 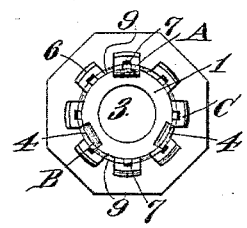
Fig. V.   Fig. VI.   Fig. VII.
 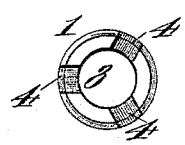 
Fig. VIII.   Fig. IX.
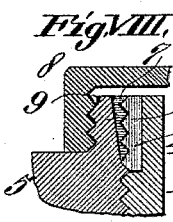 
Attest:
Stanley Stoner
N. Finley
Inventor:
Wm. L. Gordon.
By Wright Bro.
Atty's
THE NORRIS PETERS CO., PHOTO-LITHO., WASHINGTON, D. C.

UNITED STATES PATENT OFFICE.

WILLIAM L. GORDON, OF HOT SPRINGS, ARKANSAS.

NUT-LOCK.

SPECIFICATION forming part of Letters Patent No. 584,158, dated June 8, 1897.

Application filed October 1, 1896. Serial No. 607,595. (No model.)

*To all whom it may concern:*

Be it known that I, WILLIAM L. GORDON, a citizen of the United States, residing at Hot Springs, in the county of Garland, State of Arkansas, have invented a certain new and useful Improvement in Nut-Locks, of which the following is a full, clear, and exact description, reference being had to the accompanying drawings, forming part of this specification.

My present invention relates to certain improvements in that class of nut-locks wherein the bolt is provided with longitudinal grooves and the nut with lips or projections adapted to be pressed into the grooves to keep the nut from turning on the bolt.

My invention consists in features of novelty hereinafter fully described, and pointed out in the claims.

Figure I is a side view illustrative of my invention. Fig. II is a detail side view showing the threaded end of the bolt. Fig. III is an end view of the bolt. Fig. IV is an end view of the bolt with the nut applied. Fig. V is an edge view of the nut. Fig. VI is an end view of the bolt, showing the grooves cut entirely through the metal to the hollow center of the bolt. Fig. VII is a detail side view of same. Fig. VIII is a detail longitudinal section showing the nut applied to the bolt and the cap applied to the nut. Fig. IX is a similar view with the nut locked to the bolt.

Referring to the drawings, 1 represents a bolt provided with a head 2, as usual. I have shown my invention applied to a hollow bolt or a bolt having a hollow center 3, but it may be applied to a solid bolt. The threaded end of the bolt is provided with grooves 4, preferably three in number, made equidistant apart. These grooves may be cut only part way through the metal of the bolt, as shown in Figs. II and III, or they may be cut entirely through, as shown in Figs. VI and VII.

5 represents the nut, the outer face of which is provided with projections or lips 6, the width of which substantially corresponds with the width of the grooves 4. The nut is provided with a greater number of these projections than there are grooves in the bolt. I have shown the nut provided with eight projections. The object of this is to provide for the locking of the nut upon a very slight adjustment of it. In Fig. IV one of the projections is shown engaged with one of the grooves at A, and should it be desired to adjust the nut slightly tighter the projection at B will be opposite the groove in the bolt, and should it be desired to adjust the nut still slightly tighter the projection at C will come opposite the groove in the bolt.

The inner surfaces of the projections 6 are grooved, as shown at 7, Figs. VIII and IX, so that when a projection has been forced into engagement with one of the grooves in the bolt and it is desired to force this projection out of the groove, so as to permit the nut to be turned to further tighten, loosen, or remove it, a wedge-shaped tool may be forced in under the projection to spring it back out of the groove in the bolt without injury to the thread on the projection.

The peripheries of the projections are threaded, as shown in Figs. V, VIII, and IX, to receive a cap 8. (See Fig. I.) This cap excludes dust and moisture from the projections and from the end of the bolt and also tends to hold the depressed projection into engagement with the groove in the bolt and likewise adds a finished appearance to the bolt.

The outer surfaces of the outer ends of the projections are turned off, as shown at 9, Figs. VIII and IX, so as to give an opportunity for the projection to be struck with a tool to force them into the grooves without injury to the thread that receives the cap.

I claim as my invention—

1. In a nut-lock, the combination of a bolt provided with longitudinal grooves on its threaded end, and a nut having projections adapted to be forced into said grooves, said projections being more in number than the grooves in the bolt, substantially as and for the purpose set forth.

2. In a nut-lock, the combination of a bolt having grooves formed in its threaded end, and a nut having projections adapted to be forced into said grooves, the inner surfaces of the outer ends of said projections being reamed out, substantially as and for the purpose set forth.

3. In a nut-lock, the combination of a bolt having grooves formed in the threaded end, a nut having projections adapted to be forced into said grooves and being threaded on their peripheries, and a cap adapted to screw over said projections, substantially as set forth.

4. In a nut-lock, the combination of a bolt provided with grooves on its threaded end, a nut provided with projections to fit in said grooves, and a cap adapted to fit over said projections, substantially as set forth.

5. In a nut-lock, the combination of a bolt provided with grooves on its threaded end, and a nut provided with projections to fit in said grooves, said projections being provided with grooves 7, substantially as and for the purpose set forth.

6. In a nut-lock, the combination of a bolt provided with grooves on its threaded end, a nut provided with projections externally threaded and which are adapted to be pressed into said grooves, and a cap adapted to fit over said projections; said projections being grooved as shown at 7, and turned off as shown at 9, substantially as and for the purpose set forth.

WM. L. GORDON.

In presence of—
A. C. JONES,
J. L. BENTZ.